W. C. SHAW & C. D. CHAPMAN.
DOMESTIC COOKING VESSEL.
APPLICATION FILED AUG. 15, 1912.
1,063,609.
Patented June 3, 1913.
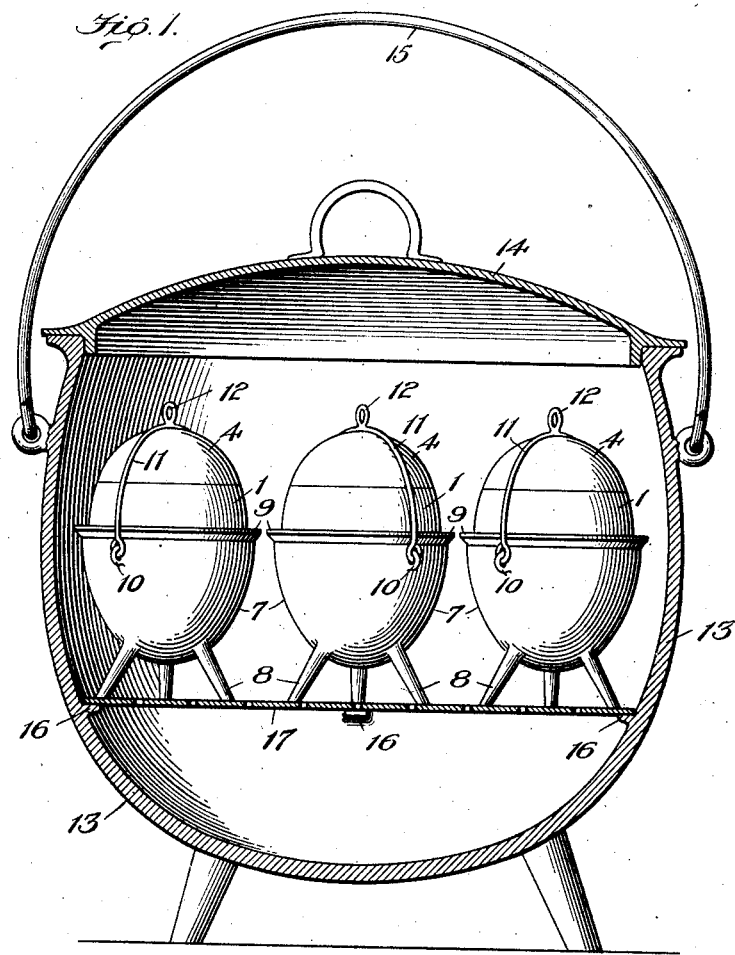
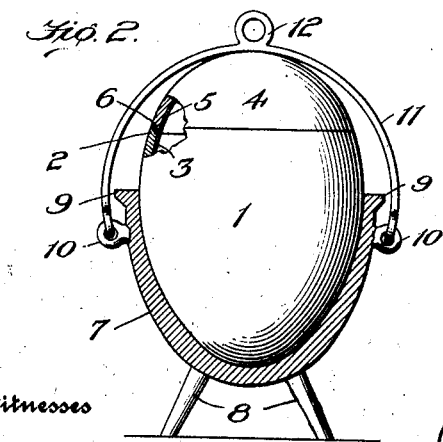
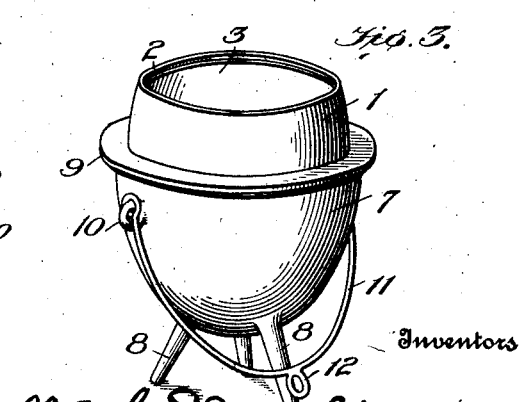

UNITED STATES PATENT OFFICE.

WILLIAM C. SHAW AND CYRUS D. CHAPMAN, OF CLEVELAND PARK, DISTRICT OF COLUMBIA.

DOMESTIC COOKING VESSEL.

1,063,609.   Specification of Letters Patent.   Patented June 3, 1913.

Application filed August 15, 1912. Serial No. 715,232.

*To all whom it may concern:*

Be it known that we, WILLIAM C. SHAW and CYRUS D. CHAPMAN, citizens of the United States, residing at Cleveland Park, in the District of Columbia, have invented certain new and useful Improvements in Domestic Cooking Vessels; and we do hereby declare the following to be a full, clear, and exact description of the invention, such as will enable others skilled in the art to which it appertains to make and use the same.

Our invention relates to domestic cooking utensils, but has reference more particularly to boiling or steaming appliances, and to novel features of construction therein which will hereinafter more fully and at large appear.

It has for its object primarily, the production of superior means for cooking and serving eggs as an article of food, means whereby the entire nutritive properties of the egg are preserved during the process of cooking, and means whereby it may be served upon the table in a most convenient and appetizing manner with a total absence of the troublesome, embarrassing or mussy conditions which frequently attend the opening of ordinary soft boiled eggs in their natural shells.

As a further object our invention contemplates the production of an egg receptacle or cooker, of pleasing and appropriate design, comprising an egg receptacle having a removable interfitting water tight top or cover, and an individual holder for said receptacle provided with a bail adapted to close over the top aforesaid and to detachably retain the several parts in their respective assembled positions during the process of cooking; or, to permit the removal of said top and afford easy access to the contents after cooking.

These and other structural or operative features and advantages will be apparent to persons skilled in the art to which the present invention relates, and to such we lay claim the same as if herein specifically mentioned.

The invention will be hereinafter more particularly described and pointed out in the claims following.

In the accompanying drawings which form part of this application for Letters Patent, and whereon like numerals refer to corresponding parts in the several views: Figure 1, is a central sectional view of an ordinary boiling pot or kettle having a removable false bottom, upon which latter are supported several individual cookers embodying the present invention, the latter being shown in side elevation. Fig. 2, represents in side elevation an egg receptacle having a removable end or cover and partly broken away disclosing its interfitting connection, also a concave holder for said receptacle in vertical central section, and a bail upon said holder closed over the cover aforesaid, and, Fig. 3, is a perspective view of parts shown by Fig. 2, with top or cover removed.

Reference being had to the drawings and numerals thereon, 1 indicates an egg receptacle or cooker preferably spun, pressed or otherwise formed of sheet metal, having a shoulder 2 surrounding its upper edge, and provided with an interior lining 3 of porcelain or similar material. Surmounting this member 1 is a removable upper end or cover 4 similarly lined as at 5 and having a shoulder 6 surrounding its lower edge, thereby producing an interfitting water tight joint between the two convex members 1 and 4, constituting a covered egg receptacle, preferably, though not necessarily, in the form of a natural hen's egg slightly enlarged. The artificial or imitation egg shell thus produced is snugly seated at its lower end in a concave holder 7 of cast metal, or other heat absorbing heat retaining material, and is supported in an upright position by feet 8 beneath, or by equivalent means. Its upper edge is surrounded by a horizontal flange 9 beneath which, at points diametrically opposite, are outwardly projecting eyes 10, 10. In the said eyes are pivotally mounted opposite ends of a spring bail 11, the latter provided with an outwardly projecting central eye 12 as shown, said bail being arranged and adapted to close over the cam-like or convex surface of the removable end or cover 4 to detachably retain all parts together, and also to serve as a means of lifting and transporting the entire structure.

As thus far described a complete egg cooker and server for individual use is produced which presupposes any well-known form of kettle or boiler in which it may be submerged during the process of cooking. Fig. 1 of the drawings, however, illustrates a form of "scotch kettle" 13 for this purpose, having a close fitting lid 14, and a lifting bail 15; but provided with special interior lugs 16 upon which rests a perforated false bottom 17 as a support for a plurality of egg receptacles such as hereinbefore described.

This being a description of our invention in its best form of construction at present known to us, its use, operation, and some of its advantages will now be set forth as follows: One or more eggs, divested of their natural shells, having been deposited into a receptacle 1, according to the fixed capacity and size of such receptacle, cover 4 is applied, thereby inclosing and practically sealing the contents within an artificial casing or imitation shell thus formed. The latter is thereupon introduced into holder 7, which it snugly fits, and its spring bail 11 is next elevated until it impinges against the convex or cam-like upper end of cover 4 over which it rides to the position indicated by Fig. 2, thereby more firmly seating said cover and securely retaining the several parts together. The required number of receptacles 1 having been similarly charged with raw eggs, are next deposited within kettle 13 upon its false bottom 17 as shown by Fig. 1, water is introduced until they are submerged, heat applied in the ordinary manner and for a length of time sufficient to effect the proper cooking. This accomplished, the receptacles 1, holders 7, and perfectly cooked contents are removed bodily and served in closed and highly heated condition, until it suits the convenience of the consumer to remove cover 4 by the simple displacement of bail 11 as indicated by Fig. 3, whereupon, without removing receptacle 1 from its individual holder 7, the contents may be eaten in a convenient and agreeable manner.

It may be added that the construction hereinbefore described lends itself admirably to the custom much in vogue of cooking or scalding eggs by indirect or stored heat, as distinguished from that obtained directly from a gas, or alcohol flame, a stove or electricity. For it will be noted that an equipment such as indicated by Fig. 1, may if desired, be placed upon the breakfast table there to receive a supply of boiling water which in its confined condition serves to cook the contents of receptacles 1 to the proper consistency without a possibility of overcooking, and without a possibility of producing that toughened outer skim-surface which frequently attends the ordinary processes of cooking eggs.

Another important and very desirable feature of cooking eggs by our improved process and apparatus resides in the fact that a stale or spoiled egg will never find its way on to the table or into the hands of the consumer, its detection being certain when broken into the receptacle 1 preparatory to cooking.

This being substantially our invention, it should be understood that we do not for a moment consider it limited to receptacles of egg shape, nor holders 7 of the particular configuration shown and described, but on the contrary, claim the exclusive right to construct said parts of any convenient shape, size or configuration in conjunction with a cover for such receptacles and a bail for removably securing all of said parts together substantially as set forth; the material or materials from which the invention is constructed being likewise a mere matter of choice, provided only that it will withstand the necessary heat and moisture, and is capable otherwise of performing its intended functions.

Having thus described our invention what we now claim and desire to secure by Letters Patent is:

1. In an egg cooking and serving device the combination with an egg receptacle having a removable end, of a relatively thick heat absorbing holder for said receptacle adapted to impart heat to the latter, and a bail upon said holder arranged and adapted to close over the removable end aforesaid for detachably retaining all of said parts together.

2. In an egg cooking and serving device the combination with an egg receptacle having a removable end, of a relatively thick heat absorbing holder for said receptacle adapted to closely fit the latter and impart heat thereto, and a bail upon said holder arranged and adapted to close over the removable end aforesaid for detachably retaining all of said parts together.

3. In an egg cooking and serving device the combination with an egg receptacle having a removable end, of a relatively thick heat absorbing holder for said receptacle adapted to impart heat to the latter, means for maintaining the entire device in a vertical position, and a bail upon said holder arranged and adapted to close over the removable end aforesaid for detachably retaining all of said parts together.

4. In an egg cooking and serving device the combination with an egg receptacle having a removable end, of a relatively thick heat absorbing holder for said receptacle adapted to impart heat to the latter, supporting legs for maintaining the entire device in a vertical position, and a bail upon said holder arranged and adapted to close over the removable end aforesaid for detachably retaining all of said parts together.

5. In an egg cooking and serving device the combination with an egg receptacle having a convex removable upper end, of a relatively thick heat absorbing holder substantially conforming in shape to the lower portion of said receptacle adapted to impart heat thereto, and a spring bail upon said holder arranged and adapted to close over the convex removable end aforesaid for detachably retaining all of said parts together.

6. In a cooking utensil the combination with an egg receptacle comprising two convex interfitting water tight members, of a concave holder fitted to one of said members provided with supporting feet, and a spring bail having a centrally located eye pivotally connected to said holder arranged and adapted to close over the other of the receptacle members for detachably retaining all of said parts together.

7. In an egg cooking and serving device the combination with a plurality of egg receptacles each having a removable end, of a corresponding number of relatively thick heat absorbing holders for said receptacles each adapted to impart heat to its particular within contained receptacle, a bail upon each of said holders adapted to close over the removable end of its respective receptacle, a cooking vessel common to all of said receptacles and holders, and a false bottom in said vessel upon which all of said holders rest during the process of cooking.

8. In an egg cooking and serving device the combination with upper and lower members constituting respectively an egg receptacle and a cover therefor, of a stand or holder for said receptacle conforming interiorly in shape therewith and provided with a spring bail, whereby all of said parts are securely held together but readily separated.

9. In an egg cooking and serving device, the combination with convex members constituting respectively an egg receptacle and a cover therefor, of a stand or holder for said receptacle conforming interiorly in shape therewith and provided with a spring bail, whereby all of said parts are securely held together, but readily separated.

In testimony whereof I affix my signature, in presence of two subscribing witnesses.

WILLIAM C. SHAW.

Witnesses:
   Lucius I. Wright,
   George W. Bowers.

In testimony whereof I affix my signature, in presence of two subscribing witnesses.

CYRUS D. CHAPMAN.

Witnesses:
   Wm. E. Dyre,
   Thomas Durant.